United States Patent [19]
Carlin

[11] Patent Number: 5,147,996
[45] Date of Patent: * Sep. 15, 1992

[54] TOOL JOINT

[75] Inventor: Frank J. Carlin, Houston, Tex.

[73] Assignee: Grant TFW, Inc., Houston, Tex.

[ * ] Notice: The portion of the term of this patent subsequent to Apr. 23, 2008 has been disclaimed.

[21] Appl. No.: 687,438

[22] Filed: Apr. 18, 1991

Related U.S. Application Data

[63] Continuation of Ser. No. 408,074, Sep. 15, 1989, Pat. No. 5,010,225.

[51] Int. Cl.$^5$ ............................................. B23K 9/04
[52] U.S. Cl. ............................ 219/76.14; 219/76.12
[58] Field of Search ............... 219/76.12, 76.14, 73.21

[56] References Cited

U.S. PATENT DOCUMENTS

| | | | |
|---|---|---|---|
| 4,228,339 | 10/1980 | Scales et al. | 219/73.21 |
| 4,243,727 | 1/1981 | Wisler et al. | 219/76.14 |
| 5,010,225 | 4/1991 | Carlin | 219/76.12 |

*Primary Examiner*—Clifford C. Shaw
*Attorney, Agent, or Firm*—Jackson & Walker

[57] ABSTRACT

A method is provided for applying grooved bands of hardsurfacing on a tool joint for earth boring drill pipe. The hardfacing of the tool joint has tungsten carbide granules in an alloy steel matrix. The tool joint is rotated and an arc between an electrode and the tool joint is provided to create a weld puddle. The electrode is reciprocated parallel to the tool joint axis and the granules are fed into the weld puddle with the puddle being applied to the grooved bands around the exterior of the tool joint to a groove depth of from between about 0.75 inches to about 0.150 inches. The feed of the granules into the weld puddle is discontinued and the weld puddle is continued to be applied around the tool joint and in the grooved bands to provide a protruding substantially tungsten carbide free hardfacing surface about the outer diameter of the tool joint of from between about 0.050 inches to about 0.175 inches, and the hardfacing surface is machined down to substantially the outer diameter of the tool joint. A tool joint having the above charateristics also is provided.

1 Claim, 4 Drawing Sheets

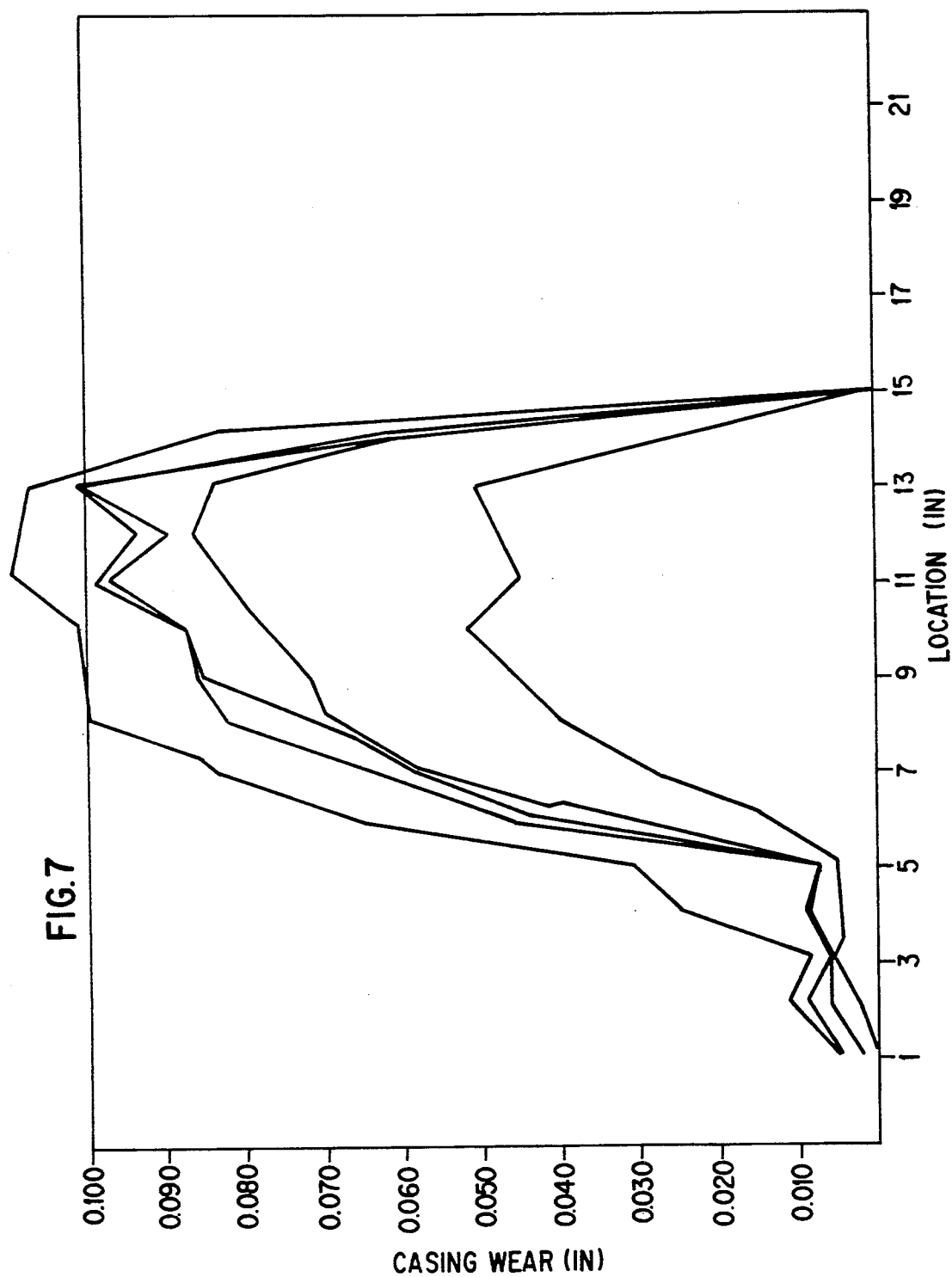

TOOL JOINT

This is a continuation of co-pending application Ser. No. 408,074 filed on Sep. 15, 1989 now U.S. Pat. No. 5,010,225.

BACKGROUND OF THE INVENTION (1) Field of the Invention

This invention relates in general to earth boring drill pipe and to hardsurfacing of tool joints or connection members relative to the drill pipe.

(2) Description of the Prior Art

The most common drill pipe used in earth boring operations have connection members or tool joints on each end that are larger in diameter than the drill pipe. Annular bands of hardfacing are commonly deposited on each tool joint. One type of hardfacing has macroscopic sintered tungsten carbide granules within an alloy steel matrix. Sintered tungsten carbide granules, as explained in U.S. Pat. No. 3,800,891, comprise microscopic grains of tungsten carbide held together by a binder of an iron group metal, usually cobalt. Sintered tungsten carbide hardfacing is normally applied on tool joints by rotating the tool joint, providing an arc with a consumable steel wire, discharging an inert gas around the wire, and gravity feeding sintered tungsten carbide granules into the weld puddle behind the wire.

One disadvantage of the resulting sintered tungsten carbide hardfacing is that many of the granules remain only partially embedded in the matrix, giving a rough, abrasive exterior. In deep wells, intermediate strings of casing are set as the well is drilled. While drilling deeper through a string of intermediate casing, the rough surface of the hardfacing can abrade and damage the casing. Consequently, it is advantageous to have a hardfacing surface free of protruding tungsten carbide granules. In U.S. Pat. No. 4,243,727, entitled "SURFACE SMOOTHED TOOL JOINT HARDFACING", a method and apparatus is shown for hardfacing tool joints using tungsten carbide granules that results in a smooth exterior. The granules are dropped directly into the arc, rather than behind the arc. This concentrates the granules toward the bottom of the hardfacing deposit and results in a harder matrix near the bottom, as well.

In U.S. Pat. No. 4,228,339, an improved method for hardsurfacing the tool joints is provided in which annular bands of hardfacing are applied using tungsten carbide granules in a steel matrix applied by means of an electrode to the welding puddle.

It has been discovered that it is extremely difficult to machine down the hardfacing containing the tungsten carbide granules, because of their extreme hardness. The removal of the outer layer of tungsten carbide granules in hardfacing is necessary so that the hardfacing itself will not cut into or wear a surface of the casing through which the tool joint typically will be inserted. In instances in which tungsten carbide granules are within the matrix forming the hardfacing, considerable time is required to machine down the tungsten carbide granules, thus contributing significantly to the total cost of the hardfacing operation. The present invention is an improvement upon the process and product of the '339 patent, cited above, in that the puddle containing the steel matrix and the tungsten carbide granules therein is deposited in the grooves by the electrode to a given depth and thereafter the feed of granules into the weld puddle is discontinued with a continuation of the application of the puddle by the electrode to the groove to provide a protruding substantially tungsten carbide free hardfacing surface above the outer diameter of the tool joint. The protruding substantially tungsten carbide free hardfacing may then be machined down to substantially the outer diameter of the tool joint. Because the protruding hardfacing surface does not contain tungsten carbide granules, the machining operation may be effected with considerable savings of time and equipment.

The present invention provides a method of applying grooved bands of hardfacing on a tool joint for earth boring drill pipe, the hardfacing having tungsten carbide granules in an alloy steel matrix. The method includes the steps of rotating the tool joint, providing an arc between an electrode and the tool joint to create a weld puddle. The electrode is reciprocated parallel to the tool joint axis and granules are fed into the weld puddle. The weld puddle with the granules is applied within the grooved bands around the exterior of the tool joint to a grooved depth of from between about 0.75 inches to about 0.150 inches. Thereafter, the feed of the granules into the weld puddle is discontinued. The weld puddle is continued to be applied around the tool joint and in the grooved bands to provide a protruding substantially tungsten carbide free hardfacing surface above the outer diameter of the tool joint of from between about 0.050 inches to about 0.175 inches. Thereafter, the hardfacing surface is machined down to substantially the outer diameter of the tool joint.

BRIEF DESCRIPTION OF THE DRAWINGS

FIG. 7 is an axial chart similar to that of FIG. 6 showing the results of a test of a tool joint made in accordance with the present method in comparison with the effect of the same testing on bare tool joint as illustrated in FIG. 6.

DESCRIPTION OF THE PREFERRED EMBODIMENTS

Figure 1:
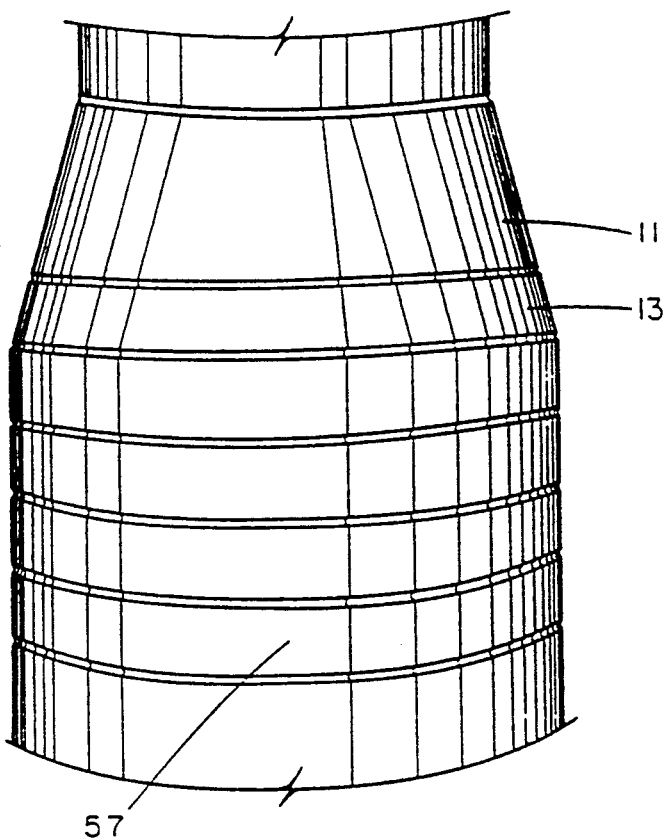
FIG. 1 is a side elevational view of a portion of a tool joint constructed in accordance with this invention.
Figure 2:
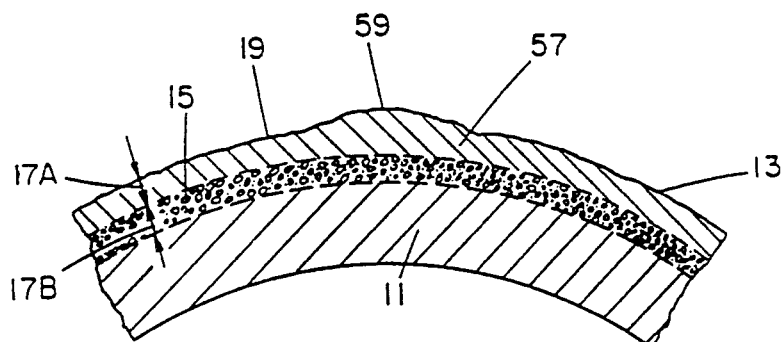
FIG. 2 is a sectional view of the tool joint of FIG. 1 taken along line 2—2.
Figure 4:
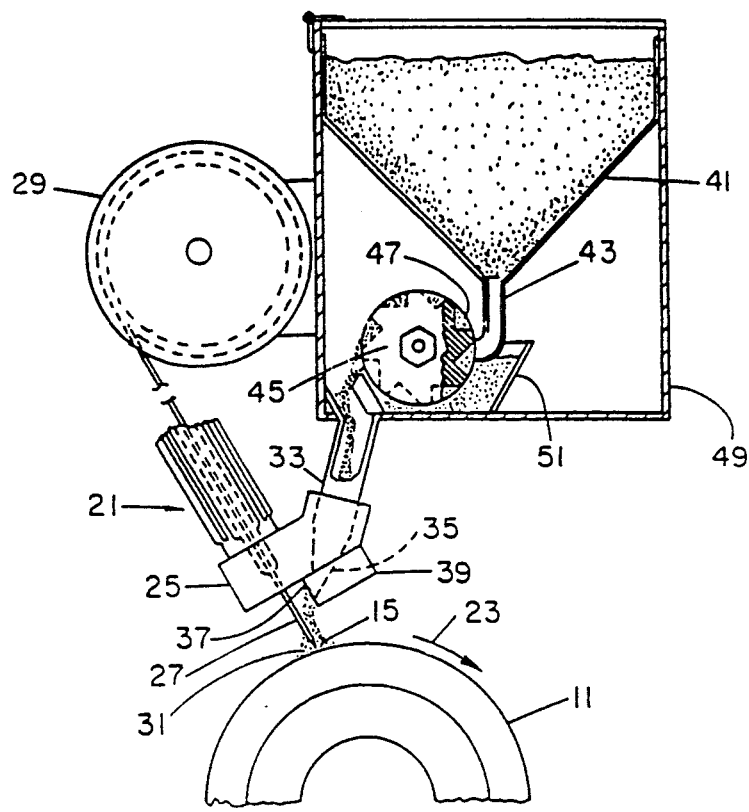
FIG. 4 is a generally schematic end view of the apparatus for the hardfacing method.
Figure 5:
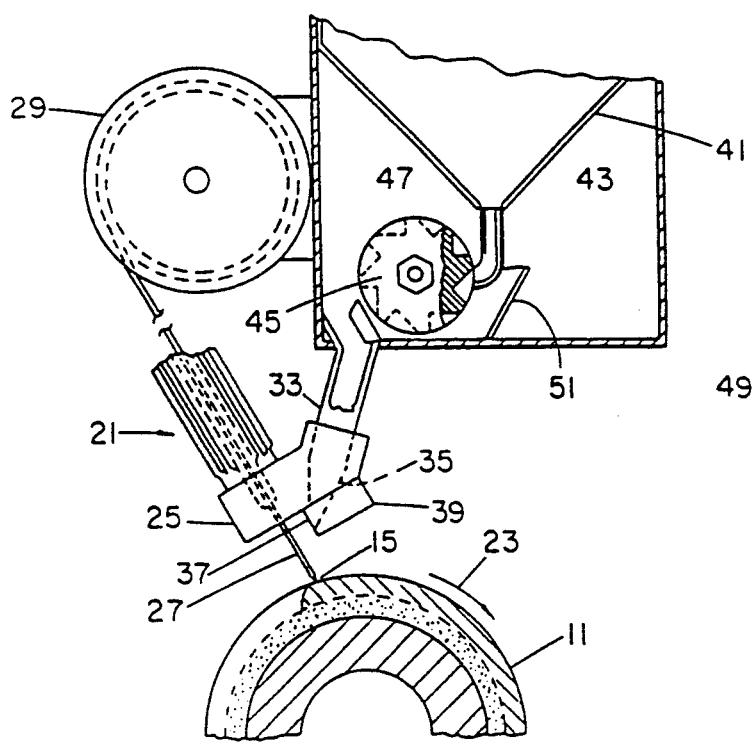
FIG. 5 is a view similar to that of FIG. 3 showing the apparatus and procedure when the feed of the granules is discontinued into the weld puddle.

Now with reference to the illustration of FIG. 1, there is shown a portion of a tool joint 11 with grooved bands 13 of hardfacing. As shown in FIG. 2, sintered tungsten carbide granules 15 are embedded in the portion 17b of the hardfacing deposit. A portion 17a of the hardfacing deposit around the exterior of the tool joint 11, a given depth, is applied subsequent to the application of the matrix 17b containing the particles 15, but the portion 17a of the matrix does not contain any such tungsten carbide granules or particles 15. The surface 19 will be substantially free of protruding particles 15 prior to machining of the outer diameter defined by that portion 17a of the deposited matrix within the band or groove 13. The hardfacing both with the sintered tungsten carbide granules 15 and without the granules 15 has been deposited on the tool joint 11 by a hardfacing apparatus 21 and procedure as shown in FIGS. 4 and 5.

Apparatus 21 includes means (not shown) for holding the tool joint 11 in a horizontal position and for rotating it in the direction shown by arrow 23. A guide member 25 is mounted with its lower surface above the tool joint 11 approximately ⅜ inch, or so. A consumable steel wire matrix 27 is mounted on a driven roller 29 that feeds the wire through the center of a guide member 25 toward the tool joint 11. The lower tip of the wire 27 is positioned approximately ¼ inch or so from the surface of the tool joint 11, leaving approximately ⅛ inch of wire exposed. The longitudinal axis of the tool guide member 25 is inclined at an angle of approximately 23° with respect to the vertical. Wire 27 serves as an electrode, and to the point at which the arc is generated between wire 27 and the tool joint surface is spaced from top dead center a circumferential distance equal to an angle of approximately 13° with respect to the vertical. Top dead center is a point at which a vertical plane passes through the tool joint exterior surface and the longitudinal axis of the tool joint.

An inert gas, preferably argon, and designated as numeral 31, is discharged from guide member 25 and envelops wire 27. Means (not shown) are included in the apparatus to reciprocate the wire 27 across the width of the band 13, parallel to the longitudinal axis of the tool.

Figure 3:
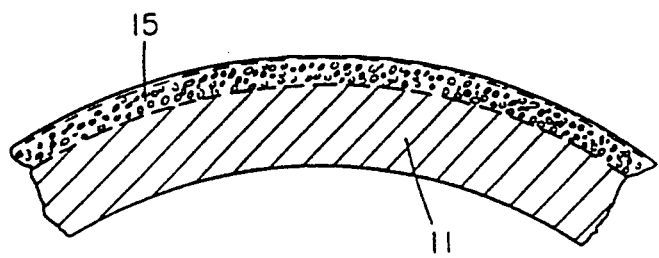
FIG. 3 is a view similar to that of FIG. 2 taken subsequent to the machining operation.

As shown in FIG. 3, granules of sintered tungsten carbide are gravity fed from a conduit or a tube 33, which is attached to guide member 25 and inclined with respect to it. Granules 15 are thread through an orifice 35 of tube 33, then through an orifice 37 of an extension block 39, and onto the surface of the tool joint 11. Orifice 37 extends flush from orifice 33 at the same angle of inclination. The forward edge of orifice 37 is positioned approximately ¼ inch from wire 27. The angle of inclination of orifice 37 is selected so that most of the granules 15 will fall directly into the arc, as shown in FIG. 4. In order to achieve the desired densities, orifice 35 and 37 must be of certain cross-sectional areas, consequently, although concentrated, a certain amount of the particles will not fall directly into the arc, but will fall in close proximity to it. A hopper 41 for holding granules 15 is mounted above the tool joint 11. Hopper 41 has an outlet tube 43 at its bottom. A driven conveyor wheel 45 is mounted adjacent the discharge end of the outlet tube 43. Wheel 45 is a plurality of receptacles 47 on its edge for conveying granules. Wheel 45 rotates by the end of the outlet tube 43 for picking up the granules as they fall out. Wheel 45 and hopper 41 are carried in a case 49. The upper end of tube 33 terminates at the bottom of case 49 at a place where it receives granules conveyed by the wheel 45 as it rotates. A tray 51 surrounds the wheel 45, outlet 43, and entrance to tube 33 to receive granules that overflow receptacles 47. Thus, as shown in FIG. 3, the tungsten carbide granules are placed in an alloy steel matrix and the weld puddle is applied within the grooved bands 13 of the tool joint 11 to a grooved depth of from between about 0.75 inches to about 0.150 inches. When this depth is reached (and ascertained by known means), the feed of the granules is terminated, but the weld puddle without the granules continues to be deposited within the grooved bands 13 to provide the hardfacing portion 17a to a depth of from between about 0.050 inches to about 0.175 inches. In other words, the depth of the weld puddle containing the tungsten carbide granules and identified 17b in FIG. 2 defines a groove depth of from between about 0.75 inches to about 0.150 inches, while the weld puddle without the tungsten carbide granules defined as portion 17a is a hardfacing surface of from between about 0.050 inches to about 0.175 inches. When the proper depth of the weld puddle defined as 17a has been established, and calculated in known means, the tool joint 11 is machined in conventional fashion to remove substantially all of the hardfacing surface portion 17a, such that the portion 17b containing the tungsten carbide particles does not appear on the smooth surface of the hardfacing, but begins just below the hardfacing 17a machined line subsequent to machining. In such an operation, preferably about 80% of the total hardfacing surface is machined down to substantially the outer diameter of the tool joint.

Figure 6:
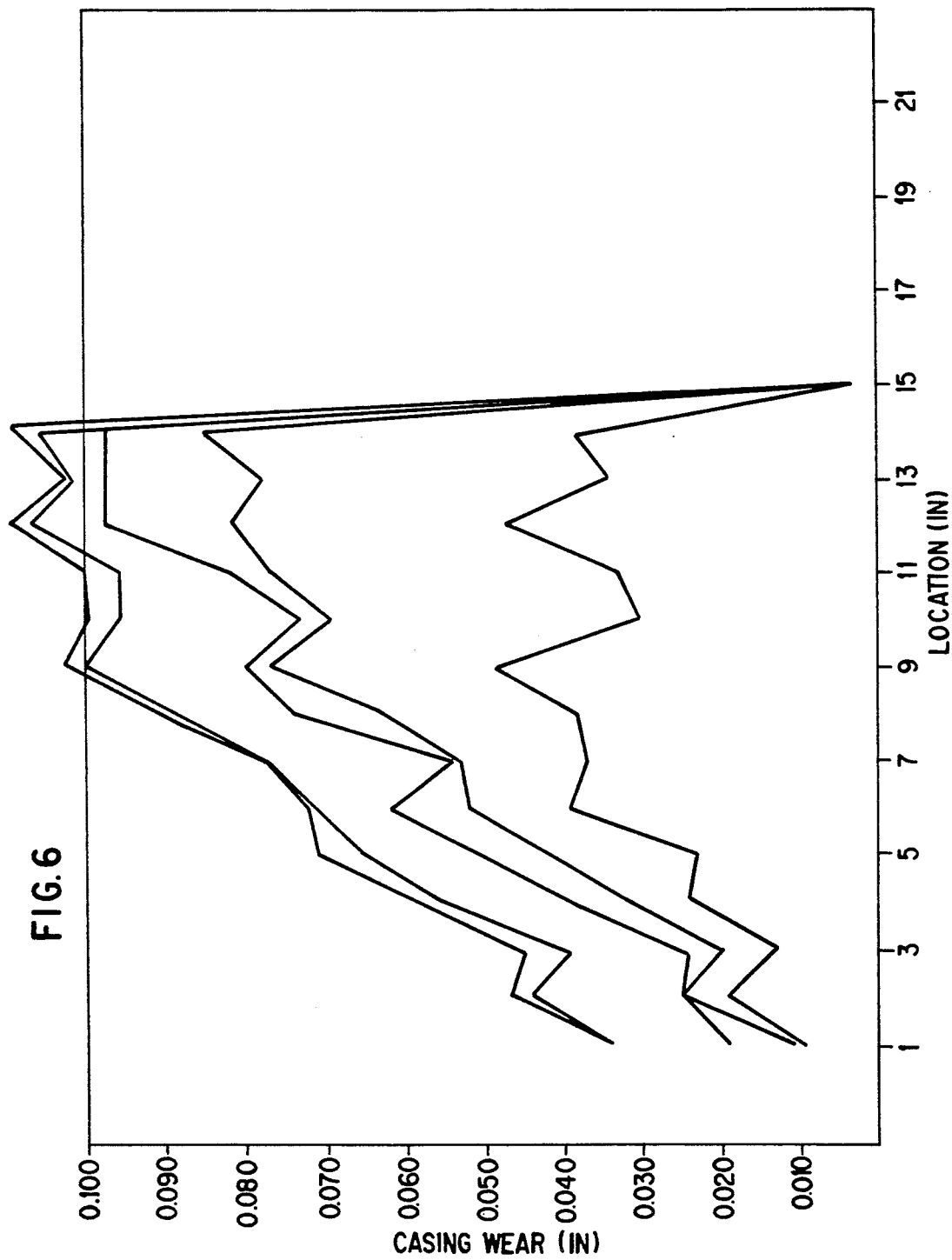
FIG. 6 is an x-y axis chart of a wear test of a bare tool joint onto a piece of casing.

In operation, granules of sintered tungsten carbide containing 5% to 7% cobalt are preferred, although other ranges and iron group binders are also feasible. One preferred size is −14 mesh to +30 mesh. To achieve a desired hardfacing density of 0.022 pounds per square inch, orifice 37 is approximately ⅛ inch wide and ¼ inch high. Tool joint 11 is rotated at approximately one rotation per minute, which is about 20-22 circumferential inches per minute. The guide member is reciprocated 85 to 95 oscillations per minute along a ⅜ inche stroke. A slight overlap provides bands of ⅜ inch wide. An arc is struck to create a weld puddle, the temperature generated being approximately 5000° F. Argon gas containing 5% oxygen is pumped into the arc. Well 45 commences rotation substantially the same time as the arc is created, dropping granules of sintered tungsten carbide into the weld puddle at the arc, during the process for the deposition of the hardfacing portion 17b. Preferably, 0.5 to 0.6 pounds per minute of sintered carbide granules are fed into the weld puddle to achieve the desired density. The deposit averages 0.10 inches in thickness. Now with reference to FIG. 6, there is shown an axial x-y chart of the results of a test procedure, which is conventional to the industry, wherein the tool joint 11 made in accordance with the present invention is tested is a cyclical test of friction of the tool joint 11 relative to a section of casing concentrically housing the tool joint 11 in the test procedure. In the test reflected in the chart shown in FIG. 6, a bare tool joint is cyclically reciprocated back and forth on the casing section, with the lines representing time factor. In comparison with the results of the test shown in the chart of FIG. 7, it can be seen that the wear pattern of the tool joint of the present invention in comparison with the bare tool joint is quite similar. In FIG. 6 and FIG. 7 location of wear is defined inches on the casing section versus the amount of casing wear in inches, over time. As can be seen from the testing chart, a flush hardfacing surface is provided on the tool joint 11 which provides maximum contact area which reduces contact stress and thus casing wear.

In providing a tool joint 11 containing hardfacing having therein tungsten carbide particles, as deposited on the tool joint 11 in accordance with the present invention, the surface can be machined to provide a smooth surface finish. Previously, the only practical way to obtain a smooth surface finish was by means of grinding the hardfacing, which is an extremely tedious and time consuming procedure. Breakage of cutting components of machines used in the machining operation will not occur because of the lack of the presence of the tungsten carbide particles in the portion of the hardfacing to be machined.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A tool joint for earth boring drill pipe, comprising:
A metallic cylindrical housing adaptable at at least one end for securement to a drill pipe member; and
an outer face around the exterior of said housing, a portion of said face having hardfacing comprising tungsten carbide granules in an alloy steel matrix, the hardfacing extending outwardly of said housing no more than substantially the outer diameter of the housing, said hardfacing having no tungsten carbide granules within said substantially outer diameter of the housing.

* * * * *